United States Patent
Joseph et al.

(10) Patent No.: US 10,181,997 B2
(45) Date of Patent: Jan. 15, 2019

(54) METHODS, SYSTEMS AND COMPUTER READABLE MEDIA FOR PROVIDING RECEIVE PORT RESILIENCY IN A NETWORK EQUIPMENT TEST DEVICE

(71) Applicant: Ixia, Calabasas, CA (US)

(72) Inventors: Vinod Joseph, Thousand Oaks, CA (US); Noah Steven Gintis, Westlake Village, CA (US)

(73) Assignee: KEYSIGHT TECHNOLOGIES SINGAPORE (HOLDINGS) PTE. LTD., Singapore (SG)

(*) Notice: Subject to any disclaimer, the term of this patent is extended or adjusted under 35 U.S.C. 154(b) by 0 days.

(21) Appl. No.: 15/451,367

(22) Filed: Mar. 6, 2017

(65) Prior Publication Data

US 2018/0254969 A1    Sep. 6, 2018

(51) Int. Cl.
*H04L 12/26* (2006.01)

(52) U.S. Cl.
CPC .............. *H04L 43/50* (2013.01); *H04L 43/12* (2013.01); *H04L 43/16* (2013.01)

(58) Field of Classification Search
CPC ......... H04L 43/00; H04L 43/08; H04L 43/03; H04L 43/028; H04L 43/50; H04L 43/0876; H04L 43/0882; H04L 2012/5628; H04L 29/0621; H04L 2209/26; G06F 11/30
See application file for complete search history.

(56) References Cited

U.S. PATENT DOCUMENTS

| 7,222,255 B1 * | 5/2007 | Claessens | H04L 12/2697 709/224 |
| 9,531,620 B2 | 12/2016 | Ciodaru et al. | |
| 2013/0003565 A1 * | 1/2013 | Gotwals | H04L 43/50 370/248 |
| 2013/0163445 A1 * | 6/2013 | Majumdar | H04L 43/50 370/252 |
| 2013/0346814 A1 * | 12/2013 | Zadigian | G01R 31/28 714/724 |

FOREIGN PATENT DOCUMENTS

WO   WO2016171690 A1 * 10/2016

OTHER PUBLICATIONS

"Aggregation Filtering, and Load Balancing for 10GBE/40GBE Networks," Ixia XSTREAMTM 40, Ixia Data Sheet, Document No. 915-6800-01-6061 Rev H, pp. 1-7 (Jul. 2016).

* cited by examiner

Primary Examiner — Mohamed A Kamara

(57) ABSTRACT

A system for providing test receive port resiliency includes a network equipment test device including a port module for transmitting test packets to and receiving packets from a device under test (DUT). The system further includes a port central processing unit (CPU) associated with the port module for processing packets that the CPU receives from the DUT. The system further includes a configurable pre-filter associated with the port module for pre-filtering the packets to prevent at least some of the packets from being forwarded to the port CPU. The system further includes a pre-filter rules generator for analyzing the packets forwarded to the port CPU and for automatically generating a pre-filtering rule to be used by the pre-filter for filtering subsequent packets received from the DUT.

23 Claims, 7 Drawing Sheets

METHODS, SYSTEMS AND COMPUTER READABLE MEDIA FOR PROVIDING RECEIVE PORT RESILIENCY IN A NETWORK EQUIPMENT TEST DEVICE

TECHNICAL FIELD

The subject matter described herein relates to a network equipment test device that transmits test packets to and receives test packets from a device under test. More particularly, the subject matter described herein relates to providing receive port resiliency in a network equipment test device.

BACKGROUND

Network equipment test devices test network equipment by transmitting packets to and receiving packets from the network equipment. Examples of network devices that are tested include switches, routers, firewalls, network address translators, servers, load balancers, etc. Examples of tests that are performed include stress tests, performance tests, protocol compliance tests, and other tests that involve the processing of packets by a device under test (DUT).

In order to test network equipment, network equipment test devices include ports that physically connect to DUTs. Each port includes a transceiver or physical layer chip that is responsible for transmitting packets over the wire to the DUT and receiving packets from the DUT. On the receive side, each port typically includes a front end filter implemented in hardware or firmware, that classifies received packets according to whether the packets require further processing or not. Packets of interest that require further processing are transmitted to a port central processing unit (CPU) to receive further processing. Packets that are not of interest may be ignored or discarded.

In computer networks, the line rate defines the speed at which bits are transmitted over the networks between network devices. As line rates increase, the likelihood of a port CPU becoming overwhelmed increases. For example, current network equipment test devices function at line rates of 400 gigabits per second. Port CPU processing speed has not increased proportionately with line rates. Increased line rates are typically not problematic for front end filters, which are designed to operate at line rate and only perform a limited amount of packet processing. However, if a DUT malfunctions and sends a high volume of control plane packets to a particular port CPU, the rate at which the control plane packets arrive at the port CPU may exceed the processing capacity of the CPU and cause congestion or even CPU failure.

One mechanism in test scenarios for a network equipment test device to rapidly identify packets that require and do not require further processing is to insert a signature in outgoing test packets to distinguish between data plane packets and control plane packets. For example, because test packets are synthetic packets generated by a network equipment test device, a signature that is easily detectable by a receive side front end filter of the network equipment test device can be inserted in each packet header or payload identifying the packet as requiring port CPU processing or not. In one implementation, data plane packets do not require port CPU processing, and control pane packet require front end processing. Accordingly, a signature may be inserted in each generated packet to identify the packet as a data plane or control plane packet. The front end filter can detect the signature in received packets and use the signature to identify the data plane packets that should not be sent to the port CPU. However, if the device under test sends data plane packets without the signature to the network equipment test device or the device under test sends a higher volume of control plane packets to the network equipment test device than the port CPU can handle, port CPU congestion and even failure can occur.

Accordingly, in light of these difficulties, there exists a need for methods, systems, and computer readable media for providing receive port resiliency in a network equipment test device.

SUMMARY

The subject matter described herein includes methods, systems, and computer readable media for providing receive port resiliency in a network equipment test device. The term "receive port" is intended to include ports with both transmit and receive capabilities or receive-only capabilities. Thus, providing receive port resiliency includes reducing the likelihood of overloading of received packet processing resources when those resources are dedicated to processing received packets and when some of those resources are also used to transmit packets.

One exemplary system for providing receive port resiliency includes a network equipment test device having a port module for transmitting test packets to and receiving packets from a device under test (DUT). The system further includes a port central processing unit (CPU) associated with the port module for processing packets that the CPU receives from the DUT via the port the system further includes a configurable pre-filter associated with the port module for pre-filtering the packets to prevent at least some of the packets from being forwarded to the port CPU. The system further includes a pre-filter rules generator for analyzing the packets forwarded to the port CPU and for automatically generating a pre-filtering rule to be used by the pre-filter for the packets.

A method for providing receive port resiliency in a network equipment test device includes transmitting test packets to and receiving packets from a device under test (DUT). The method further includes pre-filtering the packets received from the DUT using a configurable pre-filter. The method further includes, at a port central processing unit (CPU) associated with the port module, processing packets passed by the configurable pre-filter. The method further includes analyzing, by a pre-filter rules generator, the packets forwarded to the port CPU and for automatically generating a pre-filtering rule to be used by the pre-filter for filtering subsequent packets received from the DUT.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to providing receive port resiliency in a network equipment test device. Rather than allowing all control plane traffic from a device under test to be forwarded to a port CPU, a network equipment test device according to the subject matter described herein includes a configurable pre-filter that pre-filters traffic received from a device under test using pre-filtering rules generated automatically by a pre-filter rules generator. The pre-filter rules generator automatically generates pre-filtering rules through analysis of traffic that reaches a port CPU and, in some cases, dynamically installs the rule in the configurable pre-filter while a test is running to prevent failure of a port CPU. In other cases, the port CPU is allowed to fail and the pre-filter rules generator automatically generates a pre-filtering rule based on captured traffic that reached the port CPU prior to the failure. The automatically generated rule is then installed before re-starting the testing.

Figure 1:
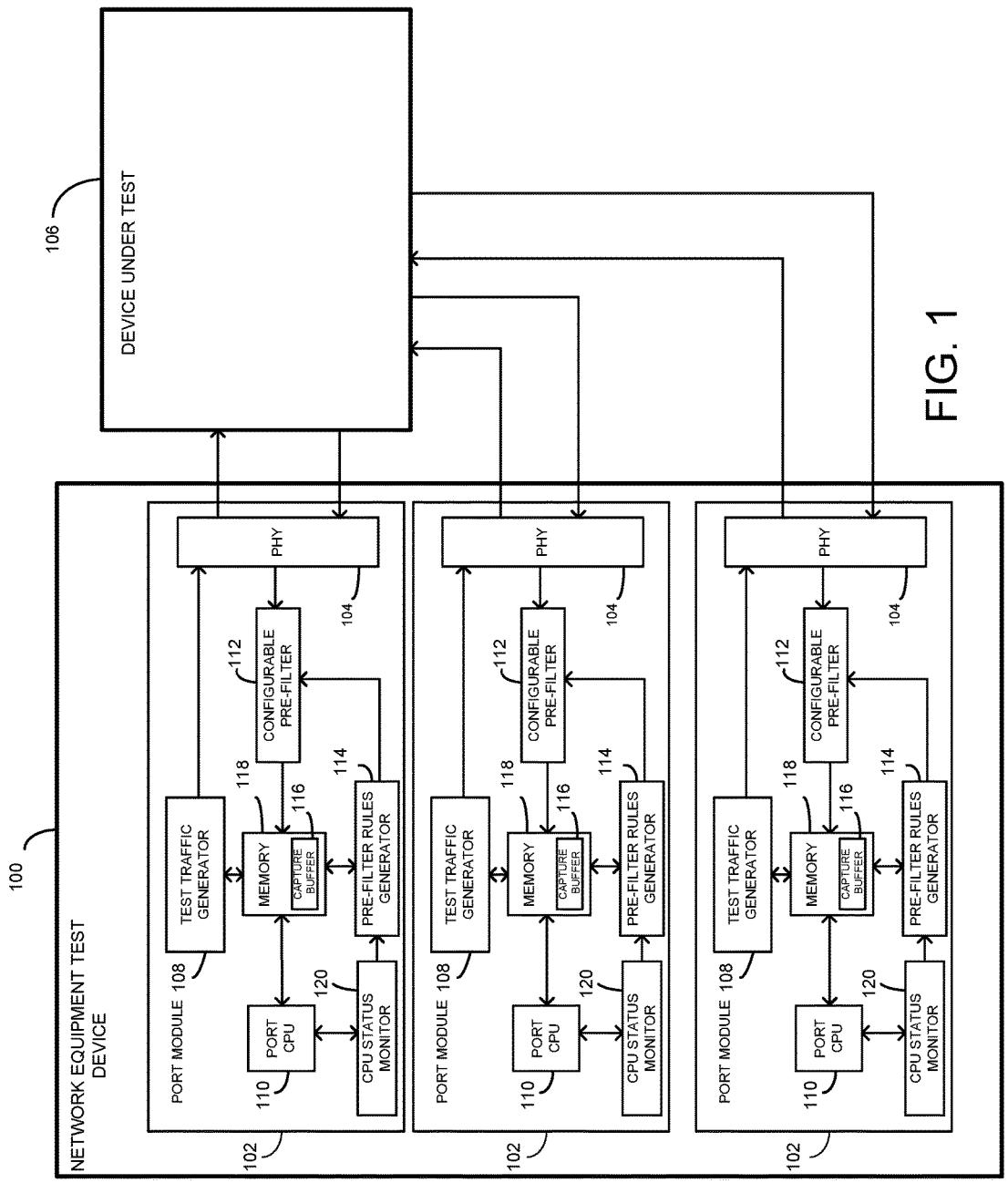
FIG. 1 is a block diagram of system for providing receive port resiliency in a network equipment test device according to an aspect of the subject matter described herein.

FIG. 1 is a block diagram of a system for providing receive port resiliency in network equipment test device. Referring to FIG. 1, the system includes a network equipment test device 100 including a plurality of port modules 102. Each port module 102 may include a printed circuit board on which plural electronic components are located. In FIG. 1, these components include a physical layer chip or PHY 104 that performs physical layer functions for transmitting data to and receiving data from a device under test (DUT) 106. A test traffic generator 108 generates test packets to be transmitted to DUT 106. A port CPU 110 controls the over all operation of port module 102 and also processes packets from DUT 106 that are forwarded to port CPU 110. In one example, control plane packets, such as border gateway protocol (BGP) and resource reservation protocol (RSVP) packets may be forwarded to port CPU 110 for further processing. As line rates increase, the volumes of such traffic being forwarded to port CPU 110 may overwhelm port CPU 110. In addition, if DUT 106 malfunctions, such malfunctioning may also generate a volume of control plane or other traffic that port CPU 110 is incapable of handling.

In order to reduce the likelihood of port CPU 110 being overwhelmed, port module 102 includes a configurable pre-filter 112 that pre-filters packets received from DUT 106 and prevents at least some packets from being forwarded to port CPU 110. Configurable pre-filter 112 may include some rules which are configurable in advance of a test, such as a rule for identifying packet signatures inserted in packets by test traffic generator 108 to distinguish between data plane traffic, which is not forwarded to port CPU 110, and control plane traffic, which is forwarded to port CPU 110. Pre-filter rules generator 114 analyzes the packets forwarded to port CPU 110 and automatically generates a pre-filtering rule to be used by pre-filter 112 for the subsequently received packets. In one example, configurable pre-filter 112 may store copies of packets transmitted to port CPU 110 in a capture buffer 116 implemented in memory 118 or in a cache or other storage medium separate from memory 118. In such an example, pre-filter rules generator 114 may analyze the packets in capture buffer 116 to generate the pre-filtering rule. Examples of analyses that may be implemented by pre-filter rules generator 114 will be described in detail below.

According to one aspect of the subject matter described herein, each port module 102 may include a CPU status monitor 120 that monitors the status of port CPU 110 and informs pre-filter rules generator 114 of the status. For example, CPU status monitor 120 may detect whether port CPU 110 is operational or non-operational (i.e., in a failed state) and also monitor the current utilization level of port CPU 110. In one example, CPU status monitor 120 may monitor the status of port CPU 110 and inform pre-filter rules generator 114 when a condition occurs. The condition may be failure of port CPU 110 or when the utilization level of port CPU 110 reaches a threshold level that is less than a level that results in failure.

When port CPU status monitor 120 detects that a condition regarding port CPU 110 occurs, port CPU status monitor 120 informs pre-filter rules generator 114. Configurable pre-filter rules generator 114 may then generate a new pre-filtering rule based on the packets that caused condition. For example, if the condition is failure of port CPU 110, pre-filter rules generator 114 may analyze packets that were forwarded to port CPU 110 prior to the failure to determine the cause of the failure. Copies of such packets may be stored in capture buffer 116. In one example, after port CPU 110 fails, pre-filter rules generator 114 may analyze the packets in capture buffer 116 and detect a high volume of TCP SYN packets from a particular IP address associated with DUT 106. To prevent such packets from causing failure of port CPU 110 in a subsequent test, pre-filter rules generator 114 may automatically generate and install a rule that blocks TCP SYN packets from the IP address that caused the failure in the previous test.

In another example, when port CPU status monitor 120 detects that the utilization of port CPU 110 is above a threshold (e.g., 80% utilization), port CPU status monitor 120 may notify pre-filter rules generator 114, and pre-filter rules generator 114 may analyze, in real time, traffic stored in capture buffer 116 that is causing the utilization of port CPU 110 to exceed the threshold. In one example port CPU 110 may determine that BGP packets from a particular IP address associated with DUT 106 are causing the high CPU utilization. Accordingly, to prevent failure of port CPU 110 during the test, pre-filter rules generator 114 may automatically generate and dynamically (i.e., without stopping the test) install a rule that blocks BGP packets from the IP address that is causing the CPU utilization to exceed the threshold.

According to yet another aspect of the subject matter described herein, if a pre-filter rules generator 114 associated with one port module 102 of network equipment test device 100 automatically generates a pre-filtering rule based on packets that its port module receives, the pre-filter rules generator 114 that generated the rule may automatically communicate the rule to other pre-filter rules generators 114 associated with other port modules 102 in network equipment test device 100 and the receiving pre-filter rules generators 114 may install the rule in their respective configurable pre-filters 112. In this manner, packets that are causing one port CPU 110 to become overloaded or fail may be blocked from reaching that CPU as well as other port CPUs in network equipment test device 100.

Figure 2:
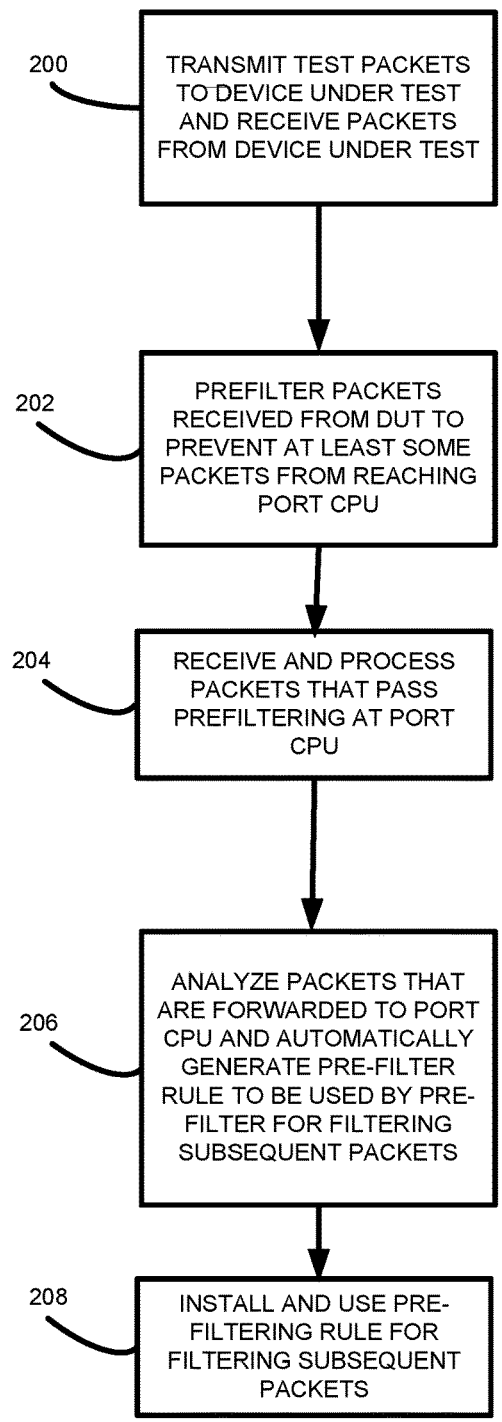
FIG. 2 is a flow chart of an exemplary process for providing receive port resiliency in a network equipment test device according to an aspect of the subject matter described herein.

FIG. 2 is a flow chart illustrating exemplary steps for providing receive port resiliency in a network equipment test device according to an aspect of the subject matter described herein. Referring to FIG. 2, in step 200, test packets are transmitted to a device under test. For example, if device under test 106 is a firewall, one port module 102 of network equipment test device 100 may implement a router associated with an autonomous system (AS) on a protected side of the firewall, and another port module 102 of network equipment test device 100 may implement another router associated with another AS on non-protected side of the firewall. The routers may exchange control plane traffic, such as BGP traffic, to provide routing information regarding their respective autonomous systems. The routers may also exchange data plane traffic transmitted between the two autonomous systems.

In step 202, the packets received from the DUT are pre-filtered using configurable pre-filter 112 to prevent at least some of the packets from being forwarded to the port CPU. Each configurable pre-filter 112 may initially be configured with one or more pre-filtering rules designed to separate control plane traffic from data plane traffic. In one exemplary implementation, test traffic generators 108 may insert a signature in an unused header field or in a payload of each data plane packet. Configurable pre-filter 112 may be configured with a rule to recognize the signature and to prevent packets having the signature from being forwarded to a port CPU. Even with such a signature mechanism, the volume of control plane traffic could overwhelm a port CPU, given ever-increasing line rates (e.g., 400 gigabits/second) without corresponding increases in CPU processing speed. Accordingly, additional pre-filtering by configurable pre-filter 112 is desirable to reduce the likelihood of the port CPU being overwhelmed. However, such pre-filtering rules may be difficult to design in advance of executing a test. The pre-filtering rules generator described herein avoids this difficulty by analyzing packets that are passed to the port CPU and utilizing information from the packets to design a pre-filtering rule that reduces the likelihood of the port CPU being overwhelmed.

Continuing with the firewall example, the configurable pre-filters 112 associated with the port modules that emulate routers in separate autonomous systems may discard received data plane traffic and forward received control plane traffic to their respective port CPUs. In step 204, the port CPU(s) receive and process packets from the DUT that pass pre-filtering. In the case of BGP packets, processing the packets may include updating route table entries based on information extracted from received BGP packets. If the BGP packets are keepalive packets, processing the packets may include resetting a BGP connection timer for a BGP peer.

In step 206, the packets forwarded to the port CPU are analyzed, and a pre-filtering rule to be used by the pre-filter for filtering subsequent packets is automatically generated. The analysis may be performed by pre-filter rules generator 114 on a continual basis as packets are received and processed by the port CPU or in response to an event, such as failure of the port CPU or utilization of the port CPU exceeding a threshold. In the examples where the port modules are emulating routers in the same or different autonomous systems, the pre-filtering rule that is automatically generated may block BGP packets of a particular type or from a particular IP address that is causing the receiving port CPU to become overloaded or fail.

In step 208, the pre-filtering rule is installed and used for filtering subsequent packets. In one example, the new filter rule may be installed dynamically to pre-filter packets during a test currently being executed without stopping the test. In another example, if the port CPU fails, the new filter rule may be installed before the test is re-started or before a new test is started.

Figure 3:
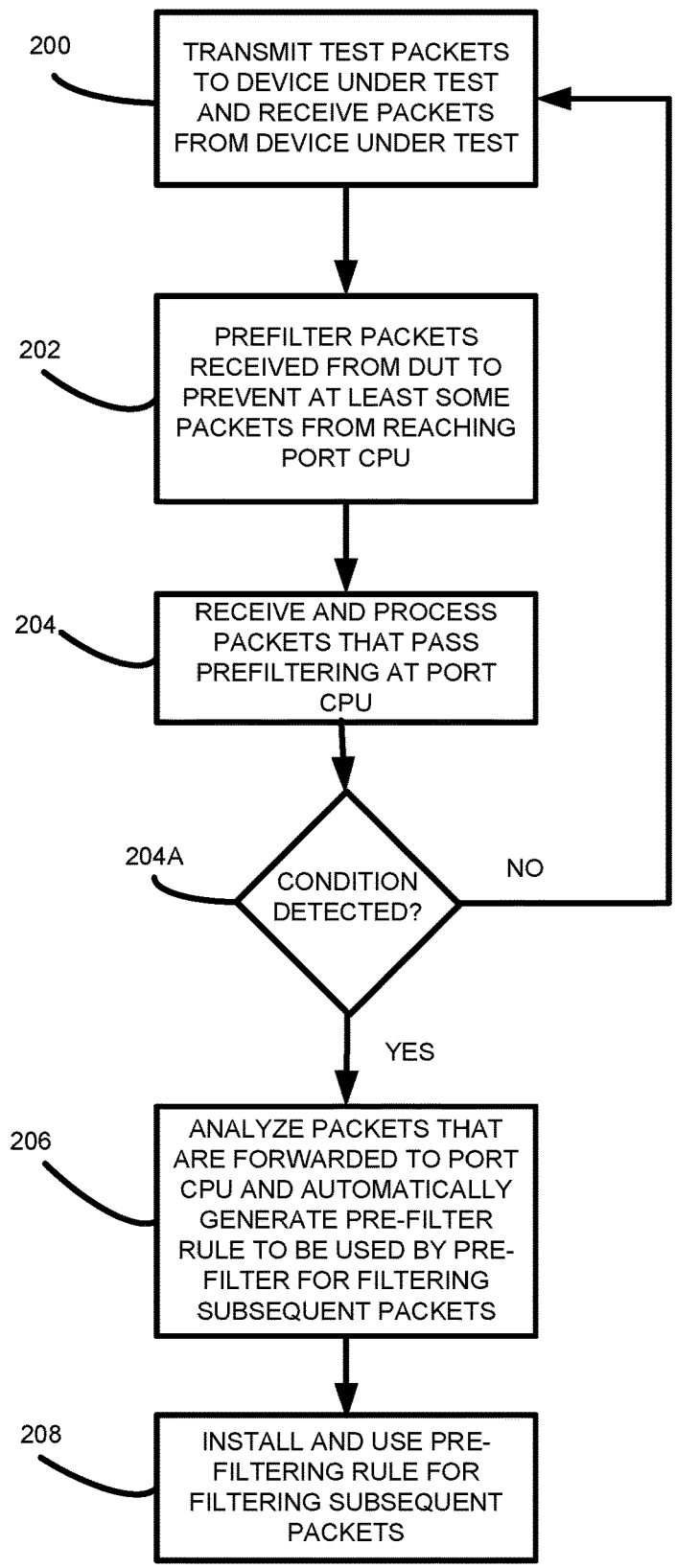
FIG. 3 is a flow chart of an exemplary process for providing receive port resiliency in a network equipment test device according to another aspect of the subject matter described herein.

FIG. 3 is a flow chart illustrating exemplary steps for providing receive port resiliency in a network equipment test device according to an aspect of the subject matter described herein. The steps illustrated in FIG. 3 are the same as the correspondingly number steps illustrated in FIG. 2. However, the process illustrated in FIG. 3 also includes step 204A where it is determined whether a condition has occurred. As described above, the condition may be failure of the port CPU or the processing utilization of the port CPU exceeding a threshold. The condition may also be the end of a test. If it is determined that a condition has occurred in step 204A, control proceeds to step 206 where packets transmitted to the port CPU are analyzed and used to generate a new pre-filtering rule. If, in step 204A, a condition has not occurred, steps 200-204A may be continually repeated to receive and process packets from the DUT without changing the pre-filtering rules.

Figure 4A:
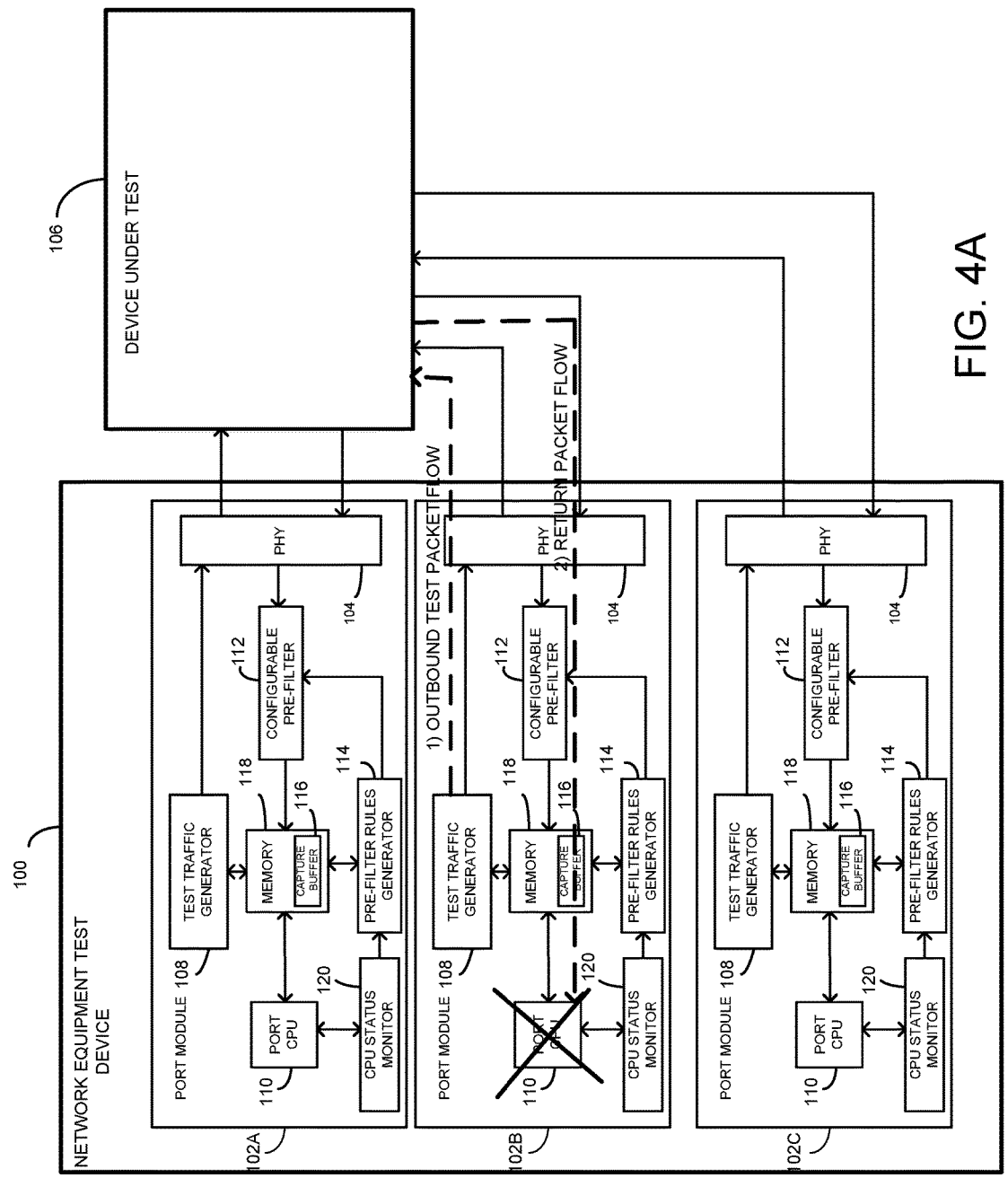
FIG. 4A is a block and message flow diagram of system for providing receive port resiliency in a network equipment test device illustrating automatic generation of a pre-filtering rule after a port CPU failure.
Figure 4B:
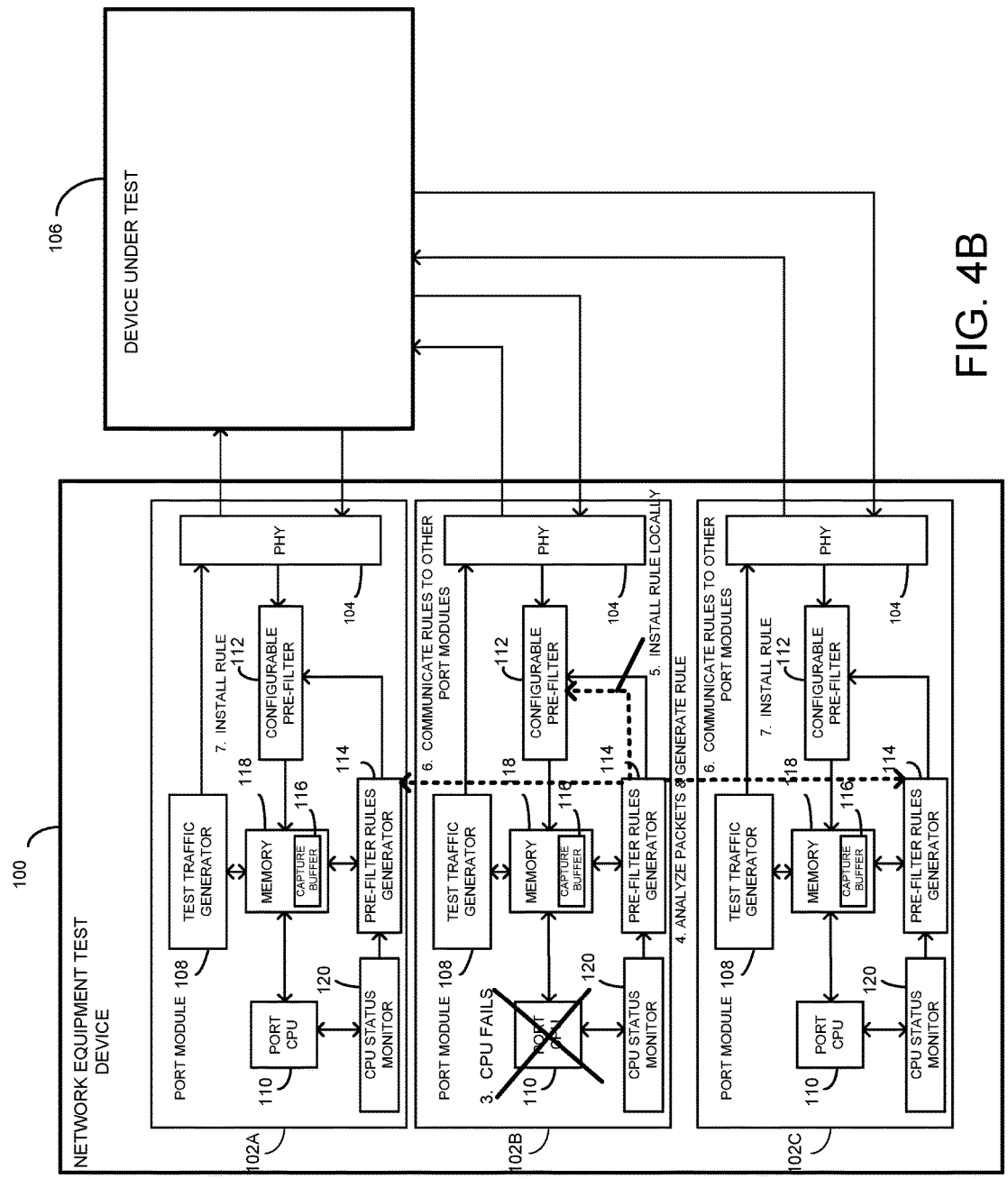
FIG. 4B is a block and message flow diagram of a system for providing receive port resiliency in a network equipment test device illustrating the distribution of a pre-filtering rule generated by one port module to other port modules in the network equipment test device.

As indicated above, according to one aspect of the subject matter described herein, a condition, such as failure, occurring at one port CPU may be used to automatically generate a pre-filtering rule that is installed and used not only to protect the failed CPU in future tests but also other port CPUs that did not fail during a test. FIGS. 4A and 4B illustrate this scenario. Referring to FIG. 4A, in step 1, test traffic generator 108 associated with port module 102B generates test packets and sends the test packets to DUT 106. In step 2, DUT 106 transmits return packets to port module 102B. In this example, it is assumed that the return packets are passed by configurable pre-filter 112 to port CPU 110 of port module 102B and eventually overwhelm port CPU 110 of port module 102B. Accordingly, in step 3, port CPU 110 of port module 102B fails.

Referring to FIG. 4B, in step 4, pre-filter rules generator 114 of port module 102B analyzes the packets that reached port CPU 110 prior to the failure and generates a new pre-filtering rule based on results of the analysis. In step 5, pre-filter rules generator 114 of port module 102B installs the new pre-filtering rule in pre-filter 112 of port module 102B. In step 6, pre-filter rules generator 114 of port module 102B communicates the pre-filtering rule to pre-filter rules generators 114 of port modules 102A and 102B. In step 7, pre-filter rules generators 114 of port modules 102A and 102B install the new filter rule in their respective pre-filters 112. In this manner, a pre-filtering rule learned by the pre-filtering rules generator of one port module is automatically communicated to and installed in the pre-filters of other port modules, thus protecting their CPUs from failing for a similar reason as the port CPU of port module 102B.

Although in the examples illustrated in FIGS. 1, 4A, and 4B, test packets are transmitted to the DUT from one port module, and return packets are received by the same port module, the subject matter described herein is not limited to such an implementation. Test packets may be transmitted by any port module in the network equipment test device, and return packets may be received by the same port module or a different port module.

In the examples described above, data plane packets are distinguished from control plane packets using signatures inserted by the network equipment test device in the data plane packets that identify the data plane packets as data plane packets. Control plane packets are identified by the absence of a data plane signature. In an alternate implementation, control plane packets may be identified and forwarded to the port CPU by the presence of a signature identifying the packets as control plane packets, and data plane packets may be identified as data plane packets by the absence of the control plane signature.

Although the examples described herein relate to automatically generating pre-filtering rules to reduce control plane traffic from reaching a port CPU, the subject matter described herein is not limited to such an embodiment. Automatically generating a pre-filtering rule for preventing any type of traffic from reaching a port CPU is intended to be within the scope of the subject matter described herein.

Figure 5:
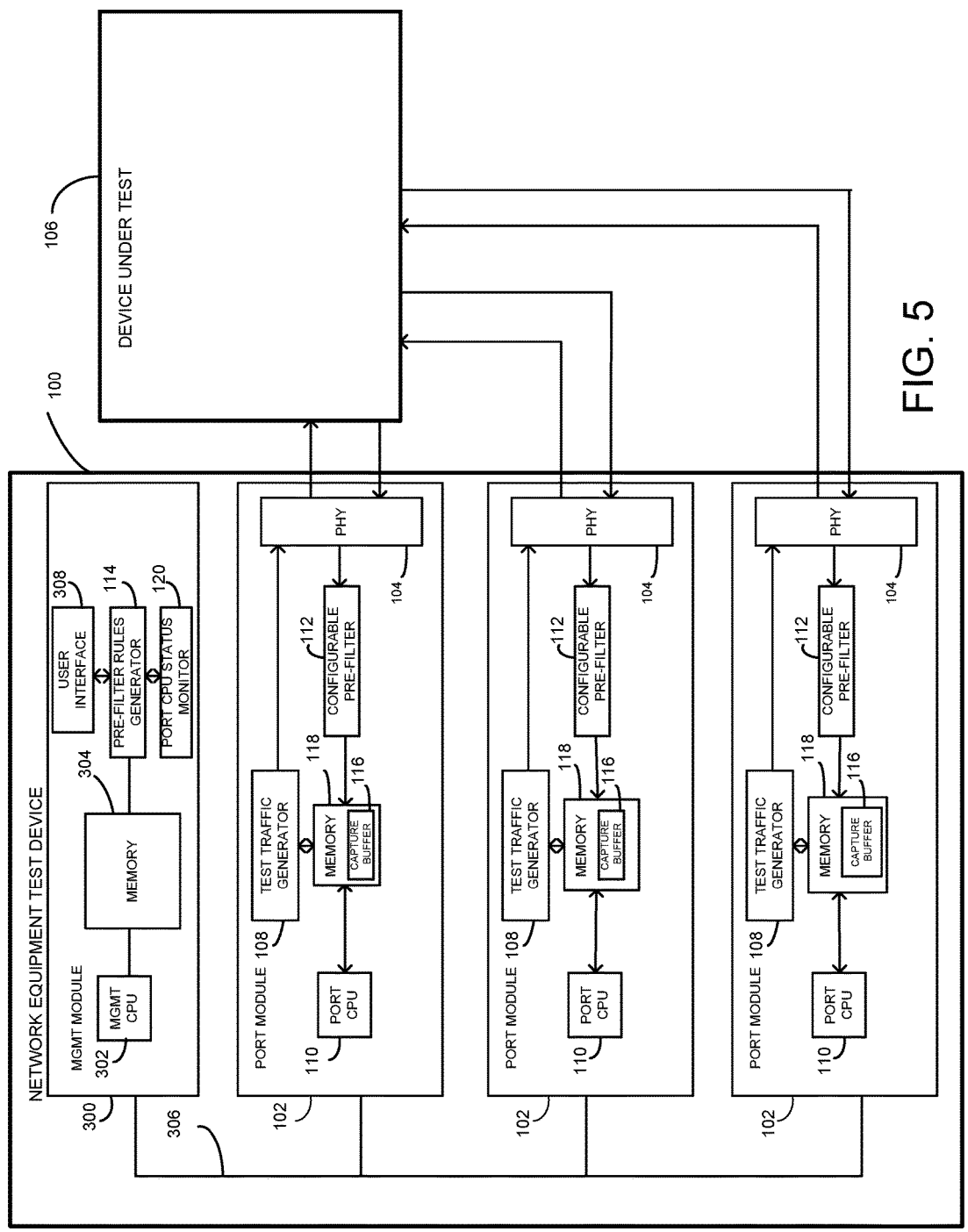
FIG. 5 is a block diagram illustrating a system for providing receive port resiliency in a network equipment test device where pre-filtering rules generation and port CPU monitoring are centralized.

Although in the examples illustrated in FIGS. 1-4B pre-filter rules generation and port CPU status monitoring are distributed, i.e., located on each port module, the subject matter described herein is not limited to such an implementation. In an alternate implementation, pre-filter rules generation and/or port CPU status monitoring may be centralized, i.e., performed by components that are separate from the port modules. FIG. 5 illustrates such an embodiment. In FIG. 5, port modules 102 do not include pre-filter rules generators 114 or port CPU status monitors 110. Instead, pre-filter rules generator 114 and port CPU status monitor 110 implemented on a management module 300 that is separate from port modules 102. Management module 300 includes a management CPU 302 that controls the overall operation of test device 100, including the operations of port modules 102. Management module 300 further includes a memory 302. Management module 300 may communicate with port modules 102 via a communications bus 306 internal to network equipment test device 100. Management module 300 further includes a user interface 308 that allows a user to define pre-filter rules which pre-filter rules generator 114 of management module 300 populates to port modules 102 for installation in their respective configurable pre-filters 112.

In operation, pre-filter rules generator 114 analyzes packets that reach each port CPU 110 either prior to failure, after failure, or both. Pre-filter rules generator 114 may generate a central rule to be installed in the configurable pre-filters 112 of each port module 102 or a subset of one or more of port modules 102. CPU status monitor 120 may monitor the status of port CPUs 110, detect when a condition occurs, and, in response to detecting that a condition (e.g., port CPU utilization threshold exceeded or port CPU failure) has occurred, notify pre-filter rules generator 114 of the identity of the port module 102 that caused the condition to occur. Pre-filter rules generator 114 may then analyze the packets that caused the condition to occur, generate a pre-filtering rule based on the condition, and install the pre-filtering rule in the configurable pre-filter 112 associated with the port module 102 that caused the condition to occur and optionally in the configurable pre-filters 112 of other port modules 102.

The centralized implementation of pre-filter rules generator 114 and port CPU status monitor 120 illustrated in FIG. 5 may be advantageous when one or more of the port CPUs 112 have failed. By providing centralized analysis of rules, the cause of the failure can be analyzed without waiting for the port CPU to reboot and analyze its own failure cause.

Figure 6:
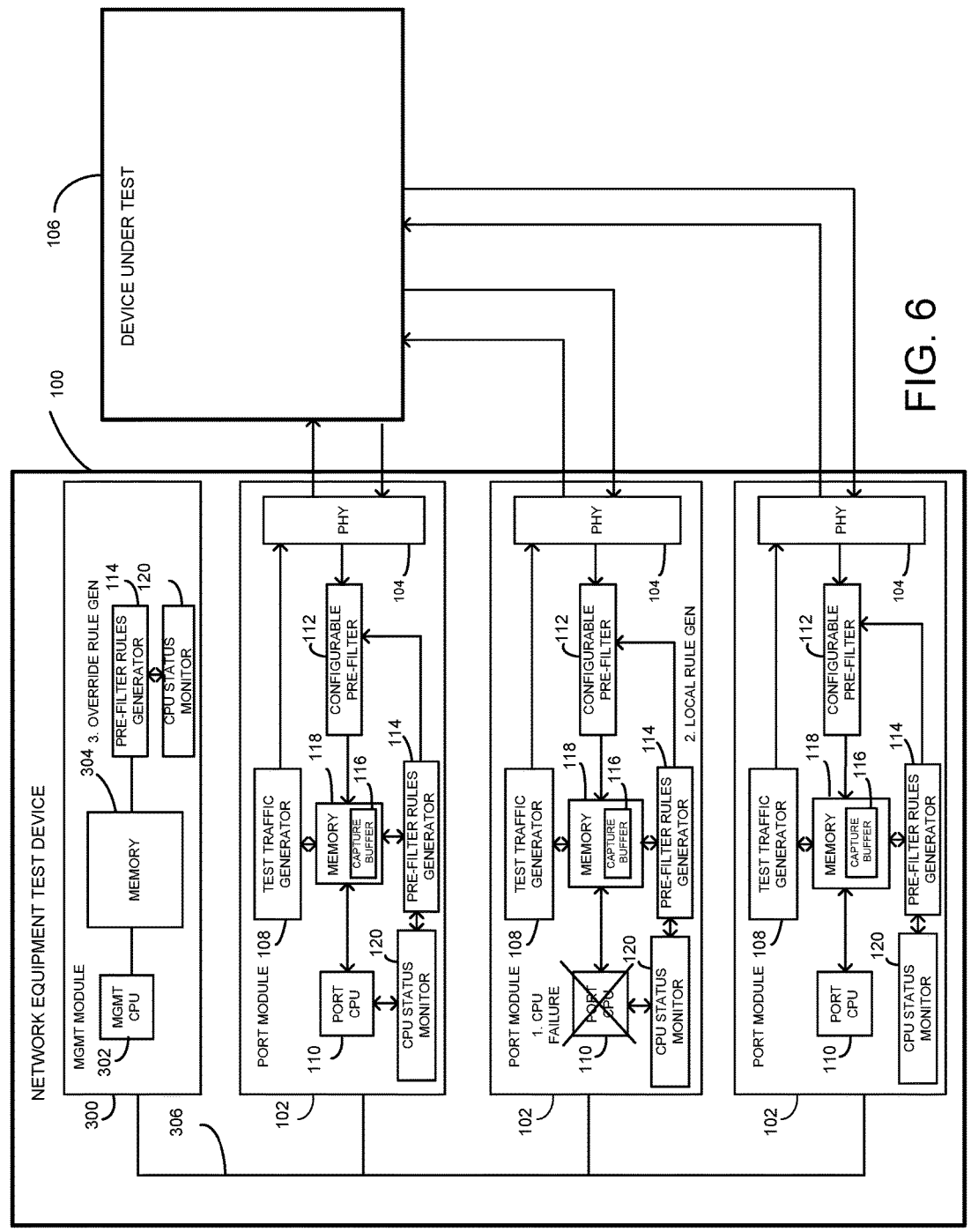
FIG. 6 is a block diagram illustrating a system for providing receive port resiliency in a network equipment test device where pre-filtering rules generation and port CPU status monitoring are both centralized and local to each port module.

In yet another alternate implementation of the subject matter described herein, centralized port CPU status monitoring and pre-filtering rules generation can be implemented in combination with CPU status monitoring and pre-filtering rules generation on each port module. FIG. 6 illustrates an example of such an implementation. Referring to FIG. 6, each port module 102 includes a CPU status monitor 120 and a configurable pre-filter rules generator 114. In addition, management module 300 includes a global port CPU status monitor 120 and a global pre-filter rules generator 114.

In operation, when a port CPU fails or crosses a utilization threshold, the local pre-filter rules generator 114 associated with the CPU that fails generates a local pre-filtering rule. Global port CPU status monitor 120 also detects the failure of the port CPU and notifies pre-filter rules generator of management module 300. Pre-filter rules generator 114 of management module 300 generates an override rule to override the local rule and communicates the override rule to the configurable pre-filters 112, which install the override rule.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for providing test receive port resiliency, the system comprising:
 a network equipment test device including a port module for transmitting test packets to and receiving packets from a device under test (DUT);
 a configurable pre-filter associated with the port module for pre-filtering the packets received from the DUT;
 a port central processing unit (CPU) associated with the port module for processing packets passed by the configurable pre-filter;
 a pre-filter rules generator implemented by at least one processor for analyzing the packets forwarded to the port CPU and for automatically generating a pre-filtering rule to be used by the pre-filter for filtering subsequent packets received from the DUT; and
 a CPU status monitor for monitoring status of the port CPU, wherein the port CPU status monitor indicates occurrence of a condition regarding the port CPU and wherein the pre-filter rules generator analyzes the packets forwarded to the port CPU prior to the occurrence of the condition and generates, based on the packets forwarded to the port CPU prior to the occurrence of the condition, the pre-filtering rule.

2. The system of claim 1 wherein the pre-filter rules generator is configured to communicate the pre-filtering rule to the configurable pre-filter and wherein the configurable pre-filter is configurable to automatically and dynamically install the pre-filtering rule.

3. The system of claim 1 wherein the network equipment test device includes a plurality of port modules, each having a port CPU and a configurable pre-filter and wherein the pre-filter rules generator is configured to forward the pre-filtering rule to each of the port modules of the network equipment test device for installation in the pre-filter of each port module.

4. The system of claim 3 wherein the pre-filter of each port module is configured to automatically and dynamically install the pre-filtering rule.

5. The system of claim 1 wherein the condition comprises failure of the port CPU or the port CPU crossing a utilization threshold.

6. The system of claim 1 comprising a capture buffer associated with the port module, wherein the pre-filter is configured to store copies of packets that are forwarded to the port CPU in the capture buffer.

7. The system of claim 6 wherein the pre-filter rules generator is configured to analyze the packets in the capture buffer to generate the pre-filtering rule.

8. The system of claim 1 wherein the network equipment test device incudes a management module and a plurality of port modules and the pre-filter rules generator is associated with the management module and generates pre-filtering rules to be installed in configurable pre-filters of the port modules.

9. The system of claim 8 wherein the pre-filtering rules generator generates a global pre-filtering rule for overriding local rules generated by pre-filtering rules generators associated with the port modules.

10. The system of claim 8 wherein the management module includes a user interface that allows a user to define pre-filtering rules for the configurable pre-filters associated with the port modules.

11. The system of claim 8 wherein the management module includes a global port CPU status monitor for monitoring status of CPUs of port modules associated with each of the port modules.

12. A method for providing test receive port resiliency, the method comprising:
at a port module of a network equipment test device, transmitting test packets to and receiving packets from a device under test (DUT);
pre-filtering the packets received from the DUT using a configurable pre-filter;
at a port central processing unit (CPU) associated with the port module, processing packets passed by the configurable pre-filter;
analyzing, by a pre-filter rules generator, the packets forwarded to the port CPU and for automatically generating a pre-filtering rule to be used by the pre-filter for filtering subsequent packets received from the DUT; and
monitoring status of the port CPU, wherein monitoring status of the port CPU includes detecting occurrence of a condition regarding the port CPU and wherein the method further comprises and analyzing the packets forwarded to the port CPU prior to the occurrence of the condition and generating, based on the packets forwarded to the port CPU prior to the occurrence of the condition, the pre-filtering rule.

13. The method of claim 12 comprising communicating the pre-filtering rule to the configurable pre-filter and automatically and dynamically installing the pre-filtering rule.

14. The method of claim 12 wherein the network equipment test device includes a plurality of port modules, each having a port CPU and a configurable pre-filter and wherein the method further comprises forwarding the pre-filtering rule to each of the port modules of the network equipment test device for installation in the pre-filter of each port module.

15. The method of claim 14 comprising automatically and dynamically installing the pre-filtering rule in the pre-filter of each port module.

16. The method of claim 12 wherein the condition comprises failure of the port CPU or the port CPU crossing a utilization threshold.

17. The method of claim 12 comprising storing copies of packets that are forwarded to the port CPU in a capture buffer associated with the port module.

18. The method of claim 17 wherein analyzing the packets forwarded to the port CPU comprises analyzing the packets in the capture buffer to generate the pre-filtering rule.

19. The method of claim 12 wherein the network equipment test device incudes a management module and a plurality of port modules and the pre-filter rules generator is associated with the management module and generates pre-filtering rules to be installed in configurable pre-filters of the port modules.

20. The method of claim 19 wherein the pre-filtering rules generator generates a global pre-filtering rule for overriding local rules generated by pre-filtering rules generators associated with the port modules.

21. The method of claim 19 wherein the management module includes a user interface that allows a user to define pre-filtering rules for the configurable pre-filters associated with the port modules.

22. The method of claim 19 wherein the management module includes a global port CPU status monitor for monitoring status of CPUs of port modules associated with each of the port modules.

23. A non-transitory computer readable medium having stored thereon executable instructions that when executed by a processor of a computer control the computer to perform steps comprising:
at a port module of a network equipment test device, transmitting test packets to and receiving packets from a device under test (DUT);
pre-filtering packets received from the DUT using a configurable pre-filter;
at a port central processing unit (CPU) of the port module, processing packets passed by the configurable pre-filter;
analyzing, by a pre-filter rules generator, the packets forwarded to the port CPU and for automatically generating a pre-filtering rule to be used by the pre-filter for filtering subsequent packets received from the DUT; and
monitoring status of the port CPU, wherein monitoring status of the port CPU includes detecting occurrence of a condition regarding the port CPU and wherein the method further comprises and analyzing the packets forwarded to the port CPU prior to the occurrence of the condition and generating, based on the packets forwarded to the port CPU prior to the occurrence of the condition, the pre-filtering rule.

* * * * *